United States Patent [19]

Corwin

[11] Patent Number: 5,172,746

[45] Date of Patent: * Dec. 22, 1992

[54] METHOD OF PRODUCING REINFORCED COMPOSITE MATERIALS

[76] Inventor: John M. Corwin, 703 Mt. Vernon Blvd., Oak, Mich. 48073

[*] Notice: The portion of the term of this patent subsequent to Jun. 12, 2007 has been disclaimed.

[21] Appl. No.: 498,296

[22] Filed: Mar. 23, 1990

Related U.S. Application Data

[63] Continuation of Ser. No. 258,362, Oct. 17, 1988, Pat. No. 4,932,099.

[51] Int. Cl.$^5$ ............................................. B22D 19/02
[52] U.S. Cl. ........................................ 164/97; 164/120
[58] Field of Search ..................... 16/97, 103, 105, 120

[56] References Cited

U.S. PATENT DOCUMENTS

| | | |
|---|---|---|
| 3,547,180 | 12/1970 | Cochran . |
| 3,828,839 | 8/1974 | Dhingra . |
| 4,232,091 | 11/1980 | Grimshaw et al. . |
| 4,390,583 | 6/1983 | Brazel . |
| 4,450,207 | 5/1984 | Donomoto et al. . |
| 4,476,916 | 10/1984 | Nusbaum . |
| 4,492,265 | 1/1985 | Donomoto et al. . |
| 4,506,721 | 3/1985 | Ban et al. ........................... 164/97 |
| 4,534,400 | 8/1985 | Ban et al. . |
| 4,548,253 | 10/1985 | Funatani et al. . |
| 4,566,519 | 1/1986 | Ban et al. . |
| 4,570,316 | 2/1986 | Sakamaki et al. . |
| 4,572,271 | 2/1986 | Nakashima et al. . |
| 4,586,554 | 5/1986 | Tank et al. . |
| 4,600,556 | 7/1986 | Donachie et al. . |
| 4,630,665 | 12/1986 | Novak, Jr. et al. . |
| 4,633,931 | 1/1987 | Yamaguchi et al. . |
| 4,653,569 | 3/1987 | Tank et al. . |
| 4,662,429 | 5/1987 | Wada et al. . |
| 4,671,336 | 6/1987 | Anahara et al. . |
| 4,687,043 | 8/1987 | Weiss et al. . |
| 4,696,866 | 9/1987 | Tanaka et al. . |
| 4,705,093 | 11/1987 | Ogino . |
| 4,708,104 | 11/1987 | Day et al. . |
| 4,715,422 | 12/1987 | Tommis et al. . |
| 4,755,437 | 7/1988 | Sabatie et al. . |
| 4,766,944 | 8/1988 | Sakuma et al. . |
| 4,802,524 | 2/1989 | Donomoto . |
| 4,828,008 | 5/1989 | White et al. . |
| 4,852,630 | 8/1989 | Hamajima et al. . |
| 4,901,780 | 2/1990 | Sasaki et al. ........................ 164/120 |
| 4,901,781 | 2/1988 | Ruff . |
| 4,932,099 | 6/1990 | Corwin ................................ 164/97 |
| 5,000,247 | 3/1991 | Burke ................................... 164/97 |
| 5,004,034 | 4/1991 | Park et al. ............................ 164/97 |

FOREIGN PATENT DOCUMENTS

| | | |
|---|---|---|
| 2426520 | 5/1979 | European Pat. Off. . |
| 115742 | 8/1984 | European Pat. Off. . |
| 3404092 | 6/1985 | European Pat. Off. . |
| 150240 | 8/1985 | European Pat. Off. . |
| 0291441 | 11/1988 | European Pat. Off. . |
| 0364963 | 4/1990 | European Pat. Off. . |
| 0365978 | 5/1990 | European Pat. Off. . |
| 25275 | 2/1982 | Japan . |
| 56150 | 4/1982 | Japan ................................... 164/120 |
| 155579 | 8/1985 | Japan . |
| 1048541 | 3/1986 | Japan . |
| 8603997 | 7/1986 | World Int. Prop. O. . |

OTHER PUBLICATIONS

"Tensile/Compressive Fatigue and Interface Characterization of $Al_2O_3$ Fiber/Al-2.5% Li Alloy Metal Matrix Composite," by Michael M. Buckley and Prof. J. Homeny, Jun. 1990.

"Compressive Fatigue Damage and Associated Property Degradation of Aluminum Matrix Composite," by Y. H. Huang and S. S. Wang, Jun. 1988.

(List continued on next page.)

*Primary Examiner*—Richard K. Seidel
*Attorney, Agent, or Firm*—Mark P. Calcaterra

[57] ABSTRACT

A method is disclosed for producing a reinforced composite material. A molten matrix metal is heated to a temperature substantially greater than the melting point of the matrix metal. The matrix metal is poured into a mold containing a mass of reincforcing material. The matrix metal is solidified.

8 Claims, 2 Drawing Sheets

OTHER PUBLICATIONS

"Lanxide's Two Near-Net-Shape Process Under Evaluation," by Robert R. Irving, Dec. 18, 1989, p. 38, Metalworking News Dec. 18 and 25 combined issue.

"Lanxide Corporation Opens New Materials Frontiers," MMCIAC Newsletter, Sep. 1989, vol. 9, No. 3.

"Metal-Matrix Composites-Materials of the Future," by R. A. Aronson, Machine Design, pp. 68–73 (Aug. 8, 1985).

"Advanced Metal Composites on the Move," by John C. Bittence, Advanced Materials and Processes Incorporating Metal Progress, Jul. 1987, pp. 45–49.

"GE Claims Breakthrough in Plastics Development," by Amal Kumar Naj, Wallstreet Journal, Sep. 14, 1989.

"Internal Combustion Engine Fundamentals," by John Heywood, McGraw-Hill Book Co., pp. 604–609 (1988).

"Piston Thermal Deformation and Friction Considerations," by C. H. Li, Feb. 22–26, 1982, SAE Paper No. 820086.

"Ceramic Fiber Reinforced Piston for High Performance Diesel Engines," by Donomoto, Funatani, Miura, and Miyake, Feb. 28–Mar. 4, 1983, SAE Technical Paper No. 830252.

"MMC Pistons a Solution for 1990's High Output Diesels," by T. Bedwell, Feb. 27–Mar. 3, 1989, SAE Technical Paper No. 890595.

PCT Application, International Publication Number WO 84/02927, International Publication Date Aug. 2, 1984.

PCT Application, International Publication Number WO 83/02782, International Publication Date Aug. 18, 1983.

"Weight Reduction of Engine Parts for Motorcycles," by H. Iguchi, SAE Paper No. 871187, 1987.

"Solidification Processing of Metal-Matrix Composites," Andreas Mortensen et al., Feb. 1988, p. 12, Journal of Metals.

METHOD OF PRODUCING REINFORCED COMPOSITE MATERIALS

This is a continuation application of U.S. Ser. No. 07/258,362 filed on Oct. 17, 1988, now U.S. Pat. No. 4,932,099.

BACKGROUND AND SUMMARY OF THE INVENTION

This invention relates to reinforced composite materials having a metal matrix. In a preferred embodiment, this invention relates to a method of producing a ceramic-reinforced composite material employing an aluminum alloy as the matrix metal and alumina as a reinforcement material.

Recent technological advances, particularly in the automotive and aerospace industries, have seen the increased need for stronger, lighter, and more durable materials. To meet this demand, materials formulators and producers have directed their attention towards improving the physical properties and ease of manufacture of presently known composite materials.

One composite material that recently has received increased attention is the metal-matrix composite material. In a typical metal-matrix composite, a mass of reinforcing material, such as a ceramic is dispersed within a matrix of metal. For applications requiring high material strength-to-weight ratios, aluminum alloys have been a popular matrix metal.

The integrity and strength of metal-matrix composite materials, however, is limited by an inability to completely bond a mass of reinforcing material to a matrix metal. In instances where bonding is not substantially complete, a decrease in strength , particularly fatigue strength, of the material has been observed. Therefore, it is important to produce a metal-matrix composite material having optimal adhesion between the reinforcing material and metal matrix.

At present, two basic processes and variations thereof are popularly employed to produce metal-matrix composites having ceramic reinforcement material contained in a matrix of aluminum alloy.

The first method, referred to commonly as the "squeeze" method, involves the application of high-pressures to assure infiltration of matrix metal into a mass of reinforcing fibers. See U.S. Pat. Nos. 4,492,265 and 4,450,207. According to these methods, a mass of reinforcing fibers is placed in the cavity of a casting mold and heated. Molten aluminum alloy is then poured into the mold cavity. A relatively high-pressure (in the range of fifteen to thirty-six thousand pounds per square inch) is then applied to the molten metal by a plunger. Upon application of pressure (i.e., squeezing) the molten matrix metal infiltrates the voids in the mass of reinforcing fibers. The elevated pressure is maintained until the aluminum matrix metal solidifies.

This process has certain drawbacks that significantly limit its usefulness. For example, the process is limited in practice to the production of smaller parts. This is due to the tremendous expense and high "squeezing" loads necessary to produce the material. Also, many small and/or fragile reinforcing-fiber preforms cannot withstand the high pressures necessary to practice this process. Thus, fracture and/or displacement of the ceramic reinforcement may frequently occur during this manufacturing process. Further, when extreme caution is not exercised when placing the preform in the mold, fibers from the mass of reinforcing fibers tend to get caught at the parting surface of the molds and thereby prevent a complete closure of the mold. In turn this cause undesireable leaks in the mold and also decreases the yield of successful castings. Finally, even though complete infiltration may be obtained using this process, often there is limited chemical (metallurgical) bonding between the matrix and reinforcements. As is known, mettallurgical bonding is a necessary requirement for maximum mechanical properties.

In a second method, a mass of reinforcing material, such as alumina fibers, is fitted into a stainless steel mold. One end of the mold is dipped into molten aluminum alloy. The pressure at the other end is then reduced creating a suction effect that causes the aluminum alloy to be "sucked up" or to migrate into the mass of fibers, thereby infiltrating the mass of fibers. A critical requirement for successful performance of this process is the use of an aluminum alloy containing a wetting agent of about two to three percent lithium. A wetting agent, such as lithium, is added to materials, such as aluminum, to promote the physical process of wetting, i.e., the process of establishing physical contact between a liquid and a solid. Once contact is established, spreading of the liquid to cover the solid surface can occur by virtue of capillary forces. Hence, the presence of a lithium wetting agent insures that the mass of reinforcing material is substantially infiltrated and bonded to the aluminum alloy.

This process also has significant inherent limitations. That is, the use of costly lithium and rigid metal molds makes this process very expensive. Further, this process does not lend itself readily to the manufacture of parts having anything other than a simple geometric shape. Another negative associated with this process is that rapid cooling techniques, employed of necessity to limit reaction between lithium and the reinforcing fibers, further adds to the cost of the process.

Other less popular processes are known that produce a metal-matrix composite material. One such method involves coating reinforcing fibers with various metals to promote wetting prior to casting the aluminum alloy. For instance, a coating of tin or silver has been applied to alumina just prior to pouring molten aluminum alloy. Or, in a variation of this process, fibers are coated with aluminum alloy and then sintered together, or hot-pressed. The additional coating steps, however, are very costly.

Another known method of producing ceramic-reinforced metal composite materials is a powder metallurgy method. This method can be used to obtain good distribution of reinforcement materials within a metal matrix. However, the requirements of powder metallurgy methods generally make this process unacceptable for continuous fiber or rigid preform composites.

By way of summary, the methods of the present invention relate to the discovery that by heating a molten aluminum alloy and a casting mold to a certain temperature range prior to pouring the molten alloy, the infiltration of the alloy into a mass of reinforcing material is dramatically improved without the necessity of applying an external pressure to force infiltration, and without employing an expensive wetting agent. The methods of the present invention include the steps of heating a molten matrix metal alloy to a temperature substantially greater than the melting point of the alloy. The molten metal is poured into a mold containing a mass of ceramic reinforcing materials. The metal is allowed to solidify.

Accordingly, many of the problems associated with currently available methods used to form metal matrix composites can be overcome by proper control over the casting temperature of both the mold and liquid matrix metal. Because no expensive wetting agents are necessary, and no heavy and excessively large equipment is necessary, complicated shapes can be dependably formed at relatively low cost according to the present invention. Parts produced by the present invention exhibit the desired properties of metal-matrix composites, such as high strength-to-weight ratio, high compressive fatigue strength and relatively good operating characteristics at temperatures significantly above the unreinforced matrix alloy, i.e. in the range of about 300° F. to about 600° F. for aluminum alloys.

The present invention also relates to objects produced by this process.

DESCRIPTION OF THE DRAWINGS

Other objects, features and advantages of the present invention will become more fully apparent from the following detailed description of one of the preferred embodiments, the appended claims and the accompanying drawings in which:

DETAILED DESCRIPTION OF THE PREFERRED EMBODIMENT

This is one of two applications both filed on the same day. Both applications deal with related inventions. They are commonly owned and have the same inventor. Both applications are unique, but incorporate the other by reference. Accordingly, the following U.S. patent application is hereby expressly incorporated by reference: "A Method of Producing Ceramic-Reinforced Composite Automotive Components."

The ceramic-reinforced composite materials produced by the methods of the present invention demonstrate many advantages over art-disclosed composites including, without limitation: excellent strength-to-weight properties; amenability to relatively inexpensive production of parts that are large and/or have complicated geometric shapes; and excellent compressive fatigue strength.

The present invention relates to the discovery that heating a molten matrix metal to a temperature substantially greater than its melting point, and then pouring the metal into a preheated mold, containing a mass of ceramic reinforcement material, dramatically improves the metals, infiltration of and adhesion to the mass of material.

Figure 1:
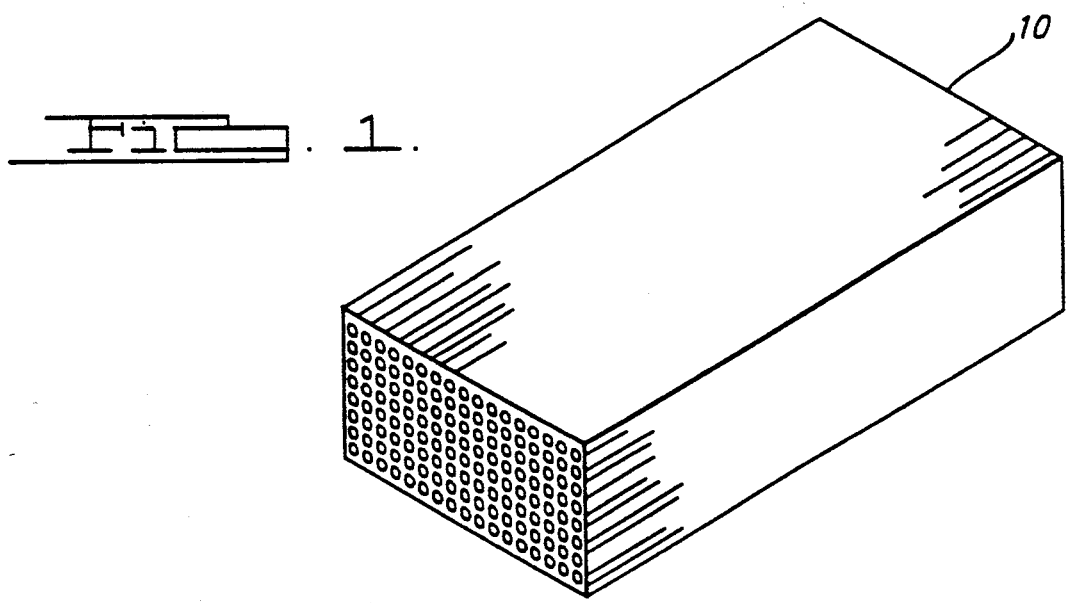
FIG. 1 illustrates a typical preformed body containing ceramic reinforcement fibers.

Referring to FIG. 1, ceramic reinforcing material to produce an article pursuant to the present invention is provided in a preformed body 10 (referred to herein as "preform"). Preferably the preform 10 contains a mass of randomly packed thin ceramic fibers, oriented in a single direction, i.e. uniaxial, which are bound together by a suitable binder or adhesive, such as wax. In the preferred embodiment, the preform is the so-called DUPONT FP preform supplied by DuPont. The DUPONT F is composed of a uniaxial mass of randomly packed alumina ($Al_2O_3$) fibers having a fiber diameter of about twenty microns. Preferably, the mass of fibers are bound together by a quantity of wax. In the present embodiment, the preferred volume percent of fibers is forty to sixty-five percent. In a more preferred embodiment, the approximate volume percent of fibers is fifty to fifty five percent. In these ranges of volume percents, the fibers should expand and substantially fill a mold cavity during subsequent steps of melting and burning out the wax from the preform.

It should be noted that any suitable reinforcing material may optionally be employed. Suitable reinforcing materials include, without limitation, those ceramic systems based upon silicon (Si), aluminum (Al), magnesium (Mg), titanium (Ti), or mixtures thereof. However, one skilled in the art will appreciate that a number of other suitable reinforcing materials exist including, without limitation, carbides, oxides and nitrides, as well as those materials containing boron or carbon. Preferably, the reinforcement material is based upon ceramic systems including $SiO_2$, SiC, $Al_2O_3$, $Al_2O_3$-$SiO_2$, MgO-$Al_2O_3$-$SiO_2$ and mixtures thereof. Preferred types of preforms include continuous fiber preforms (such as DuPont's FP), chopped fibers, mat fibers (i.e., materials having aspect ratios of greater than about 20×, and preferably greater than 100×), fibers spun from a viscous melt, fiber whiskers (i.e., materials having aspect ratios of less than 20×) sponges, extruded body preforms, and preforms that comprise mixtures or hybrids of the above types of preforms. It is preferred that the ceramic reinforcement material provided in these preforms be based upon silicon, aluminum, or mixtures thereof.

It should be noted that the fibers in the preform 10 are preferably packed in a slight compression so that subsequent expansion upon binder burnout will fix the preform in the mold. Other preferred preforms that can be employed include a foam preform, which is a monolithic ceramic body in the form of a reticulated foam; and a chopped fiber mat preform, which is an aggregate of randomly oriented fine ceramic fibers or reinforcement composed of bonded whiskers or particulates. Because of the increased potential for forming complicated shapes obtained with these latter preforms, it is also possible to form complex parts by combining some or all of the above types of preforms into a single preform, i.e., mixtures of different types of preforms may be employed.

Figure 2:
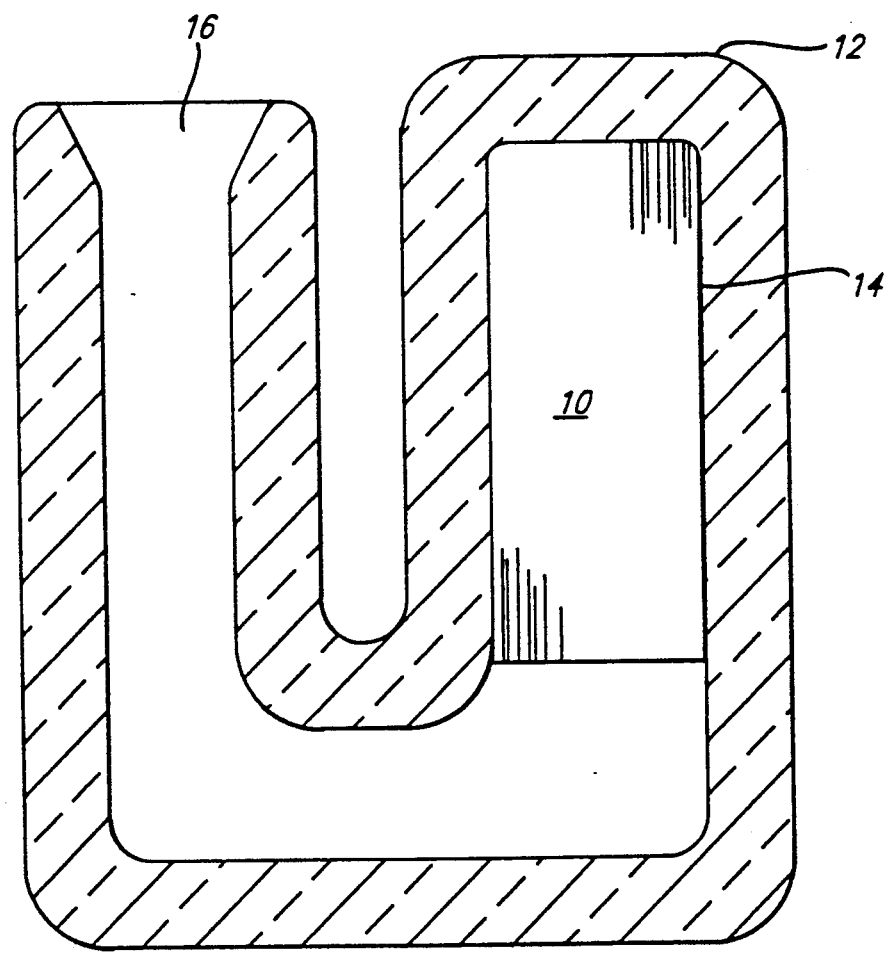
FIG. 2 illustrates a mold used to cast parts pursuant to the present invention.

Turning now to FIG. 2, an investment casting mold 12 having a cavity 14, and an opening for pouring 16, is formed using known methods, to house the alumina fibers of the preform 10 during casting. The preferred mold for the present invention should be made from a suitable fine grain ceramic material so that the resulting mold is substantially gas tight. Suitable materials include alumina ($Al_2O_3$), silica ($SiO_2$), zircon ($ZrO_2$-$SiO_2$), and mullite ($Al_2O_3$-$SiO_2$).

When the mold is formed, a wash coat is first applied to the preform "pattern". This coat, which is preferably composed of, but not limited to, stabilized zirconia or magnesia, serves to reduce vigorous reactions between the liquid metal and the mold material which might occur upon casting. Other suitable wash coat materials include $Al_2O_3$, $SiO_2$, $ZrO_2$-$SiO_2$, and zirconia ($ZrO_2$).

As shown in FIG. 2 the preform 10 is used as a pattern for fabrication of the mold cavity 4. The mold 12 containing the preform 10 is then subjected to a temperature in the range of about 400° F. to about 1,800° F. to melt and subsequently burn out the wax from the preform. Upon having burned the wax out, the fibers should expand slightly to substantially fill the mold cavity 14. One skilled in the art will appreciate that for embodiments employing a rigid preform, such as reticulated ceramic foam, design provisions may be incorporated in the preform shape to assure retention of the preform in the mold following steps of wax removal.

Figure 3:
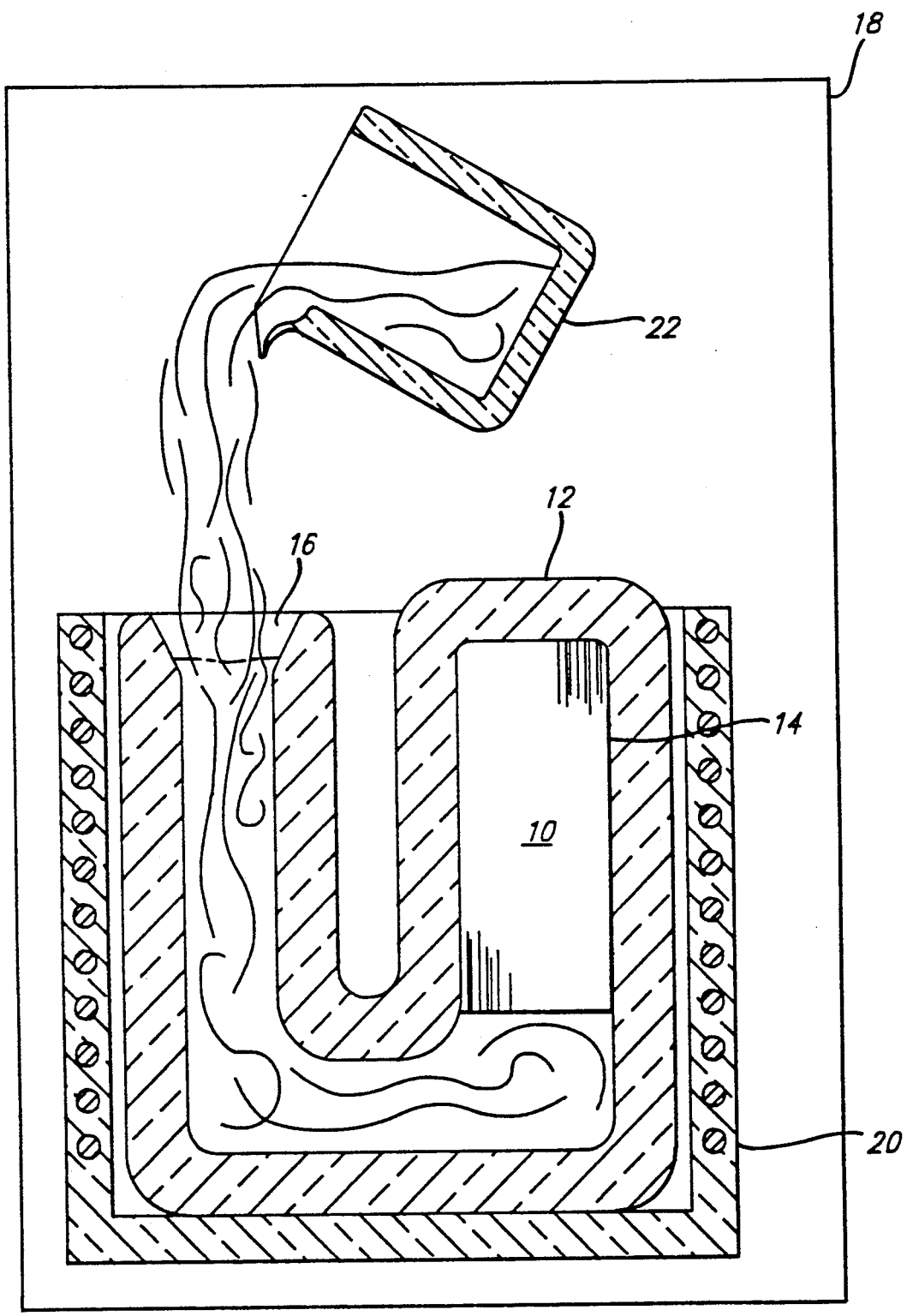
FIG. 3 illustrates the pouring of molten metal into a mold like the one shown in FIG. 2.

Referring to FIG. 3, the mold 12 and reinforcing fibers contained therein are then placed in a chamber 18 capable of being evacuated. The chamber 18 is evacuated to about 0.10 to about 0.25 mm Hg to remove potentially reactive gases. Preferably, the mold 12 containing the reinforcing fibers 10 is then heated in a resistance furnace 20 within the chamber to attain a predetermined temperature in the regions of the mold that are substantially adjacent to the reinforcing fibers. Preferably, this temperature is in the range of about 1,800° F. to about 2,200° F. More preferably, the temperature should be in the range of about 1,900° F. to about 2,050° F. This mold temperature should be substantially the same as the pouring temperature of molten matrix metal which is cast in the mold.

A matrix metal alloy is melted and heated in a melting furnace 22 within the chamber 18 to a temperature substantially greater than the melting point of the matrix metal. The temperature to which the matrix metal is heated is preferably high enough to promote wetting of the ceramic fibers during subsequent casting steps. Preferably the matrix metal is an aluminum alloy. However, any suitable matrix metal alloy may be employed including, without limitation, those containing iron, titanium, nickel, cobalt, copper, tin, magnesium, zinc, or the like. In general, the aluminum base matrix metal alloys useful in the present invention include those which contain magnesium (Mg), copper (Cu), silicon (Si), and chromium (Cr). Preferred matrix metal alloy systems include, without limitation, Al-Mg, Al-Mg-Si, Al-Mg-Cu, and Al-Mg-Cr. More preferably the aluminum alloy is one which contains about 3.5% magnesium (by weight).

The preferred aluminum alloys are accordingly heated to a temperature in the range of 1,800° F. to 2,200° F., and more preferably in the range of 1,900° F. to 2,050° F. This is a temperature of about 780° F. to about 940° F. above the melting point of the alloy. It is essential to heat this alloy to these high temperature ranges to take advantage of the reaction between the liquid metal and the ceramic reinforcing fibers in this temperature range. That is, without intending to be bound by theory, it is believed that when the molten alloy contacts the oxide ceramic fibers at these high temperatures an exchange reaction occurs between oxygen from the oxide ceramic fibers and the aluminum and magnesium in the alloy. This reaction is believed to promote wetting of the ceramic fibers. The wetting, in turn, enhances the capillary forces which drive the infiltration of liquid metal into the mass of ceramic fibers.

It is also important that the chamber pressure at this time be maintained at approximately the vapor pressure of magnesium in aluminum in order to prevent magnesium from boiling. The vapor pressure of magnesium is calculable from known thermodynamic data. At a temperature of about 1,900° F., for an aluminum alloy containing about 3.5% magnesium, this corresponds to a pressure of about 0.76 mm Hg absolute. Chamber pressure is controlled by introducing a substantially nonreactive gas, such as high-purity nitrogen gas ($N_2$) into the chamber 18.

The molten alloy is poured from the melting furnace 22 into the heated mold cavity 14 through an opening 16 in the mold 12. It should be realized that these extreme pouring temperatures tend to render the liquid-vapor interface of the molten liquid very susceptible to oxidizing and forming a thin oxide layer which tends to inhibit the flow of liquid metal, and therefore, the wetting of alumina fibers. To alleviate this problem the chamber pressure is increased to a pressure of about 760 to about 1500 mm Hg by introducing high-purity nitrogen gas almost immediately after pouring. This increase of pressure should be sufficient for the chamber atmosphere to rupture the oxide layer and permit molten metal to wet the alumina fibers. These conditions are maintained in the chamber until the infiltration of the fibers is substantially complete. The casting is then solidified and allowed to cool.

While the present invention has been disclosed in connection with one preferred embodiment thereof, it should be understood that there may be other embodiments which fall within the spirit and scope of the invention and that the invention is susceptible to modification, variation and change without departing from the proper scope or fair meaning of the following claims.

What is claimed is:

1. A method of producing a ceramic reinforced composite material, said method comprising the steps of:
    (a) melting an aluminum alloy;
    (b) heating said molten aluminum alloy to a temperature in the range of about 1,800° F. to about 2,200° F.;
    (c) pouring said molten aluminum alloy into a heated mold containing a mass of ceramic reinforcing material, said heated mold being evacuated to a first pressure which is below atmospheric pressure prior to pouring said molten aluminum alloy;
    (d) almost immediately after pouring said molten aluminum alloy, applying a second pressure greater than said first pressure to rupture an oxide layer formed from said molten aluminum alloy to permit said molten aluminum alloy to wet said mass of ceramic reinforcing material, said second pressure being in the range of about 760 to about 1500 mm Hg; and
    (e) solidifying said molten aluminum alloy.

2. A method according to claim 1 wherein the temperature of step (b) is in the range of about 1,9000° F. to about 2,050° F.

3. A method according to claim 1 wherein said mold containing the mass of ceramic reinforcing material is heated to a temperature which is substantially the same as the temperature of said molten metal.

4. A method according to claim 1 wherein said aluminum alloy contains about 3.5% (by weight) magnesium.

5. A method according to claim 1 wherein said mass of ceramic reinforcing material is provided as a preformed body.

6. A method according to claim 5 wherein said preformed body is a continuous fiber preform.

7. A method according to claim 5 wherein said preformed body is a foam preform.

8. A method according to claim 5 wherein said preformed body is a chopped fiber matte preform.

* * * * *